United States Patent
Walentowski

(10) Patent No.: US 7,600,770 B2
(45) Date of Patent: Oct. 13, 2009

(54) SUSPENSION SYSTEM

(75) Inventor: Stephan Walentowski, Duesseldorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 11/724,875

(22) Filed: Mar. 16, 2007

(65) Prior Publication Data

US 2007/0216127 A1 Sep. 20, 2007

(30) Foreign Application Priority Data

Mar. 16, 2006 (DE) .................. 10 2006 012 173

(51) Int. Cl.
*B60G 3/12* (2006.01)
(52) U.S. Cl. .................. 280/124.13; 280/124.137; 280/124.149; 280/124.157; 280/124.158; 280/124.159
(58) Field of Classification Search .......... 280/124.106, 280/124.13, 124.157, 124.158, 124.159, 280/124.16, 124.137, 124.149
See application file for complete search history.

(56) References Cited

U.S. PATENT DOCUMENTS

| 5,362,094 | A | | 11/1994 | Jensen | |
|---|---|---|---|---|---|
| 5,480,186 | A | * | 1/1996 | Smith | 280/5.511 |
| 5,597,180 | A | * | 1/1997 | Ganzel | 280/124.106 |
| 5,899,472 | A | | 5/1999 | Burke et al. | |
| 6,102,418 | A | * | 8/2000 | Runkel | 280/124.106 |
| 6,145,859 | A | * | 11/2000 | Altherr et al. | 280/124.159 |
| 6,264,212 | B1 | * | 7/2001 | Timoney | 280/5.51 |
| 6,533,294 | B1 | * | 3/2003 | Germain et al. | 280/5.511 |
| 6,669,216 | B1 | * | 12/2003 | Elser et al. | 280/124.106 |
| 6,761,371 | B1 | * | 7/2004 | Heyring et al. | 280/124.157 |
| 6,851,679 | B2 | * | 2/2005 | Downey et al. | 280/5.511 |
| 2003/0011162 | A1 | * | 1/2003 | Wallestad | 280/124.157 |
| 2005/0001401 | A1 | * | 1/2005 | Heyring et al. | 280/124.157 |
| 2005/0218619 | A1 | | 10/2005 | Kesselgruber et al. | |
| 2005/0280237 | A1 | * | 12/2005 | Stacey et al. | 280/124.16 |
| 2006/0026940 | A1 | * | 2/2006 | Cartner | 56/11.9 |
| 2006/0192361 | A1 | * | 8/2006 | Anderson et al. | 280/124.158 |

FOREIGN PATENT DOCUMENTS

| DE | 41 25 285 A1 | 2/1993 |
|---|---|---|
| DE | 102 16 132 A1 | 10/2003 |
| DE | 10 2004 040 944 A1 | 3/2005 |
| DE | 10 2004 058 441 A1 | 6/2006 |

* cited by examiner

*Primary Examiner*—Toan C To
(74) *Attorney, Agent, or Firm*—MacMillan, Sobanski & Todd, LLC

(57) ABSTRACT

A suspension system includes first and second wheel carriers, a stabilizer having a first end and a second end, the stabilizer being coupled to the wheel carriers, a first cylinder/piston unit being arranged between the first end of the stabilizer and the first wheel carrier and a second cylinder/piston unit being arranged between the second end of the stabilizer and the second wheel carrier. Each cylinder/piston unit is a double-acting cylinder/piston unit and the two cylinder/piston units are cross-connected.

5 Claims, 2 Drawing Sheets

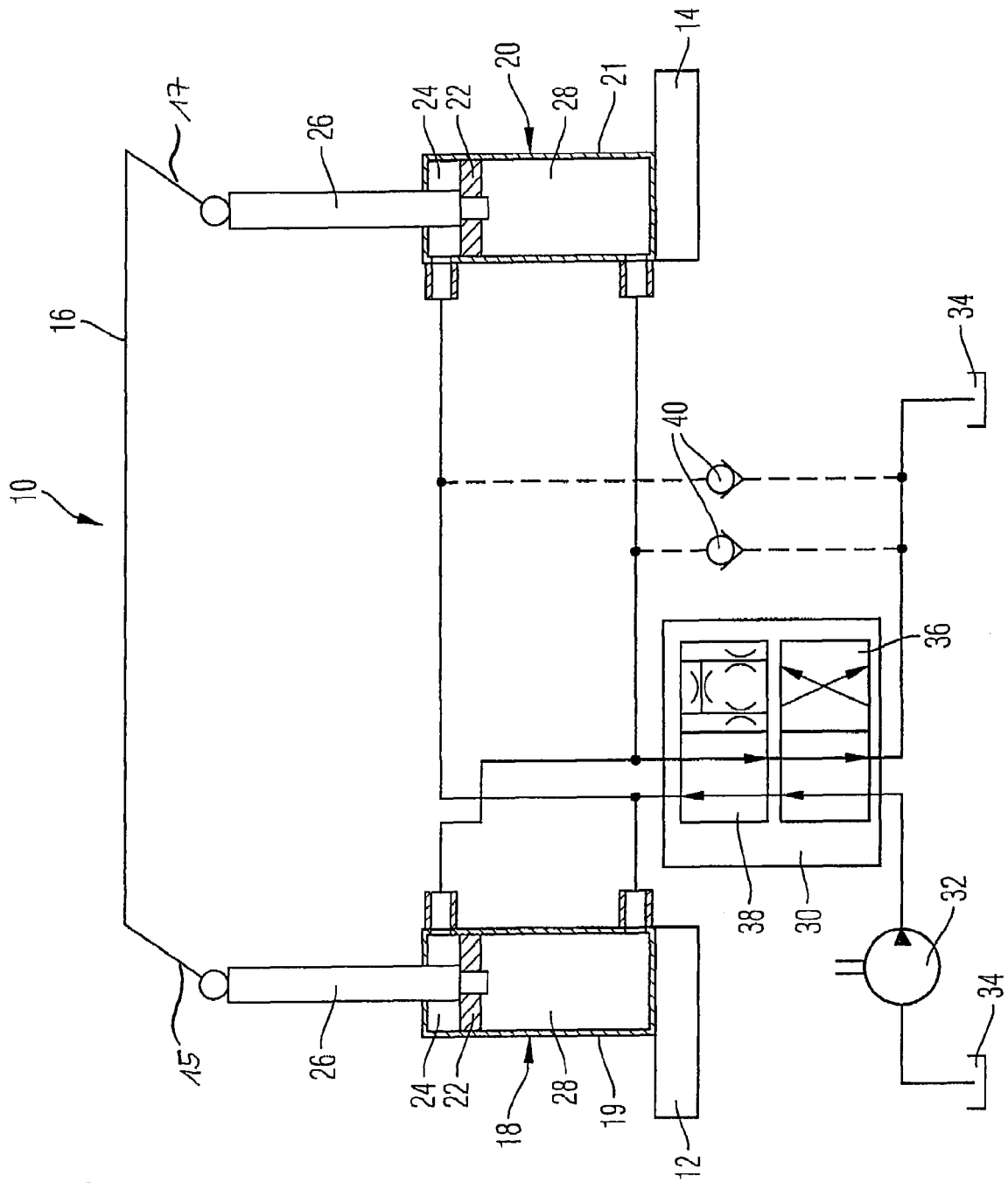

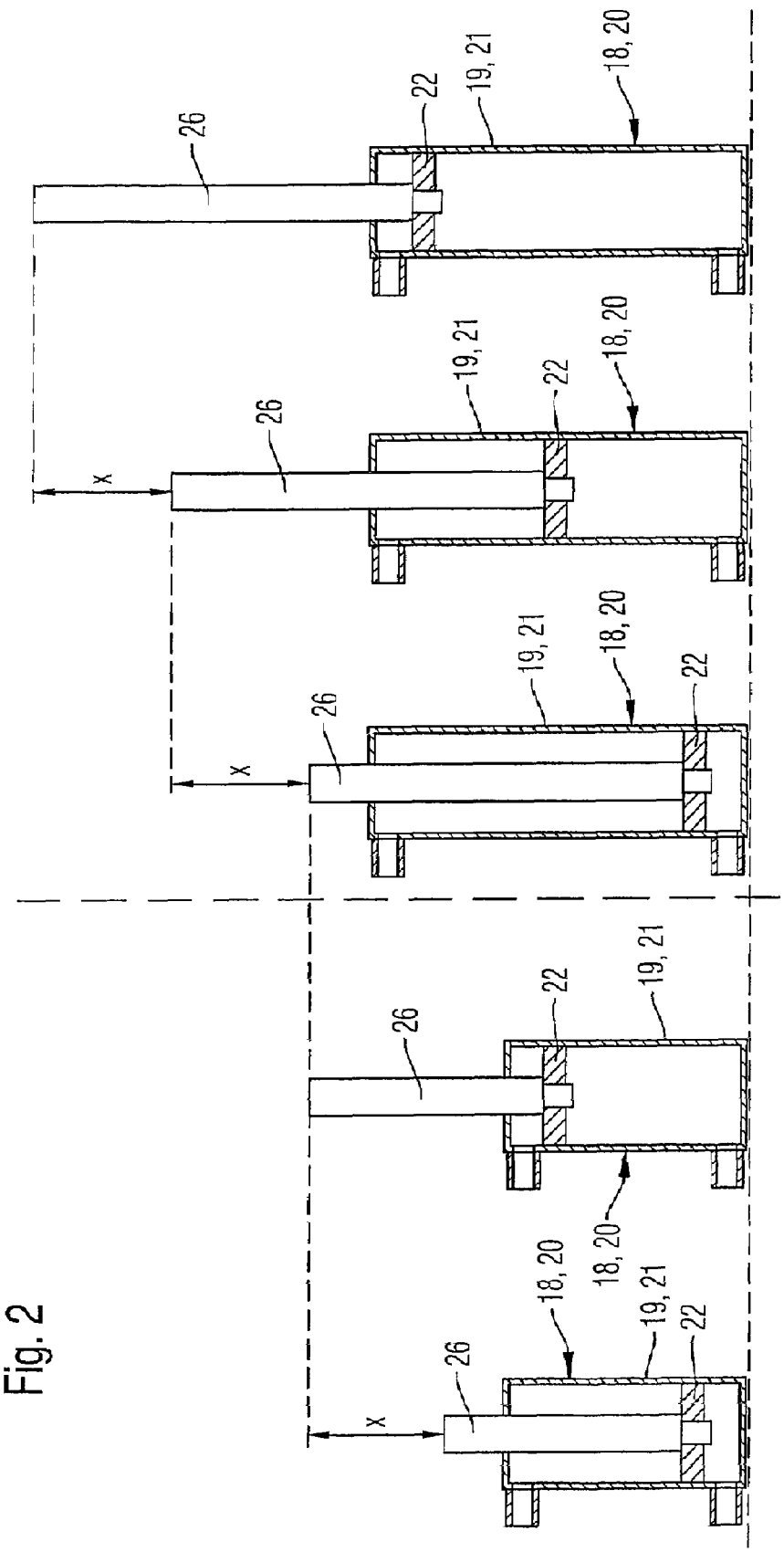

SUSPENSION SYSTEM

CROSS-REFERENCE TO RELATED APPLICATION

This application claims priority to German Patent Application No. 10 2006 012 173.2 filed Mar. 16, 2006, the disclosures of which are incorporated herein by reference.

BACKGROUND OF THE INVENTION

The invention relates to a suspension systems for vehicles.

Suspension systems for actively stabilizing a chassis are known from the prior art. Systems have been described in which each vehicle axle has an actuator associated therewith. The vehicle data provided by various sensors are converted by the vehicle electronics into actuating signals for the actuators, which then actively influence the chassis behavior according to the respective driving situation. This is accomplished for example by tensioning the stabilizer in a first or a second, opposite direction. Correspondingly, the cylinder/piston units used as actuators have a central rest position from which they are able to actively shorten or extend, in order to enable a tensioning of the stabilizer in both directions. On account of the restricted construction space in the region of the vehicle axles the required overall heights of the actuators constitute a problem in the conventional suspension systems.

In DE 41 25 285 A1 two assembly units including cylinder/piston units are associated with one vehicle axle, the two assembly units being each disposed between one end of the stabilizer and a wheel carrier of the vehicle axle. In this arrangement, these assembly units are configured such that they offer a possibility for locating their respective central position; the problem of the large overall height of the assembly units or rather the cylinder/piston units is not discussed in the document cited.

It would be advantageous to minimize the overall height of the actuators, in particular of the cylinder/piston units, in suspension systems.

BRIEF SUMMARY OF THE INVENTION

A suspension system includes first and second wheel carriers and a stabilizer having a first end and a second end. The stabilizer is coupled to the wheel carriers. A first cylinder/piston unit is arranged between the first end of the stabilizer and the first wheel carrier and a second cylinder/piston unit is arranged between the second end of the stabilizer and the second wheel carrier. Each cylinder/piston unit is a double-acting cylinder/piston unit and the two cylinder/piston units are cross-connected.

In a suspension system according to one embodiment of the present invention, the required stroke for tensioning the stabilizer is distributed onto two cylinder/piston units, whereby the overall height of the cylinder/piston units used decreases as compared to suspension system designs having solely one cylinder/piston unit per axle. Because of the smaller overall height of the cylinder/piston unit the weight of the cylinder/piston unit acting as an unsprung mass also decreases for the wheel carrier with which the single cylinder/piston unit for the entire wheel axle is associated in conventional suspension systems. The suspension system in accordance with this embodiment of the present the invention the other wheel carrier of the wheel axle now receives an additional cylinder/piston unit. Additionally, the unsprung overall mass of the actuators is then uniformly distributed among all wheel carriers of the vehicle.

Further, it is contemplated that the hydraulic cylinders of one embodiment of the present invention may be controlled by a valve block of the same design as in conventional suspension systems, thus, being able to utilize an already existing EHCU (Electronic-Hydraulic Control Unit).

Other advantages of this invention will become apparent to those skilled in the art from the following detailed description of the preferred embodiments, when read in light of the accompanying drawings.

BRIEF DESCRIPTION OF THE DRAWINGS

FIG. 1 is a hydraulic connection diagram of a suspension system in accordance with the invention; and FIGS. 2a-2e are schematic diagrams showing a comparison of the overall heights between a cylinder/piston unit of the suspension system in accordance with the invention and a cylinder/piston unit of a conventional suspension system.

DETAILED DESCRIPTION OF THE INVENTION

FIG. 1 shows a suspension system 10 including first and second wheel carriers 12, 14 schematically represented and a stabilizer 16 which is coupled to the wheel carriers 12, 14. Moreover, a first cylinder/piston unit 18 including a first hydraulic cylinder 19 is disposed between a first end 15 of the stabilizer 16 and the first wheel carrier 12 and a second cylinder/piston unit 20 including a second hydraulic cylinder 21 is disposed between a second end 17 of the stabilizer 16 and the second wheel carrier 14, each cylinder/piston unit 18, 20 being configured so as to be double-acting.

The hydraulic cylinders 19, 21, which are preferably identical, are each divided by a piston 22 into a first working chamber 24, through which a piston rod 26 extends, and a second working chamber 28, the hydraulic cylinders 19, 21 being each secured to one of the wheel carriers 12, 14, and one end of the piston rod 26 facing away from the piston 22 being each attached to one end (15, 17) of the stabilizer 16.

The hydraulic cylinders 19, 21 are cross-connected, i.e. the first working chamber 24 of the first hydraulic cylinder 19 is connected to the second working chamber 28 of the second hydraulic cylinder 21, and the second working chamber 28 of the first hydraulic cylinder 19 is connected to the first working chamber 24 of the second hydraulic cylinder 21. Moreover, the working chambers 24, 28 of the hydraulic cylinders 19, 21 are switched via a valve block 30 in such a manner that they communicate with a pump 32 or a pressureless reservoir 34. Moreover, a switching position is possible in which both the connection to the pump 32 and the connection to the reservoir 34 are blocked to a large extent, and the working chambers 24, 28 solely communicate among themselves.

The valve block 30 represented is part of an EHCU (Electronic-Hydraulic Control Unit), not shown, which constitutes an intersection between the vehicle electronics and the vehicle hydraulics. To control the hydraulic partial system represented, the valve block 30 includes two separate valves; one directional valve 36 which in the present case is a 4/2-port directional valve, and a cutoff valve 38 which in the present case is likewise a 4/2-port directional valve. For the hydraulic control of further vehicle axles the valve block 30 may moreover still include additional valves.

The manner of operation of the suspension system in the possible valve positions will be explained hereinafter:

Each of the cylinder/piston units 18, 20 is maximally extended in FIG. 1, whereby a rest position or inactive position of the suspension system 10 is defined. In that rest position, the ends of the stabilizer 16 are not rotated with respect to one another.

If in the valve position shown a hydraulic pressure is built up by the pump 32, the first working chamber 24 of the second hydraulic cylinder 21 and the second working chamber 28 of the first hydraulic cylinder 19 will be pressurized. The first cylinder/piston unit 18 has already been placed in its maximally extended position and also maintains this position after pressurization. The piston 22 of the second hydraulic cylinder 21, however, moves downwards and displaces hydraulic fluid from the second working chamber 28 of the second hydraulic cylinder 21 into the reservoir 34. On account of the movement of the piston 22 of the second hydraulic cylinder 21 the ends 15, 17 of the stabilizer 16 are rotated with respect to one another.

If the directional valve 36 is in its right-hand switching position, the suspension system 10 will behave exactly vice versa. The second cylinder/piston unit 20 remains in its rest position, whilst the piston 22 of the first hydraulic cylinder 19 moves downwards and rotates the ends 15, 17 of the stabilizer 16 with respect to one another.

When the system pressure is the same, the torsional force acting on the stabilizer 16 is equal in both directions, since in each case the force results from pressurized piston surfaces of the same size in the first working chamber 24, namely the piston cross section minus the piston rod cross section. This offers advantages as compared to conventional suspension systems in which as a rule in one direction the entire piston cross section and in the other direction the piston cross section minus the piston rod cross section is pressurized, so that the vehicle electronics has to compensate this effect.

The cutoff valve 38 is a fail-safe valve of the suspension system 10 and ensures in the case of failures in the vehicle electronics, a power failure or the like, that the suspension system 10 is able to move into its defined rest position in which the cylinder/piston units 18, 20 are maximally extended and that the suspension system 10 is substantially blocked in this rest position. Therefore, the cutoff valve 38 connects its four ports in a basic position, i.e. in a position which is assumed by the valve in a currentless state, by strong throttles. In FIG. 1, this basic position corresponds to the right-hand switching position of the cutoff valve 38. The exact system behavior is dependent on the situation in which the cutoff valve 38 assumes its basic position.

If the cutoff valve 38 assumes its basic position in the rest position of the hydraulic cylinders 18, 20 shown in FIG. 1, the cutoff valve 38 blocks the suspension system 10 in this rest position. The movement of the pistons 22 in the hydraulic cylinders 18, 20 is no longer possible, since the working chambers 24, 28 are cross-connected and the change in the volume of the two working chambers 24, 28 of one piston/cylinder unit 18, 20 differs in amount. If the piston 22 is adjusted, the volume of the working chamber 24 changes less than the volume of the working chamber 28, since the piston rod 26 extends therethrough. This difference in volume, together with the cross-connection of the working chambers 24, 28, blocks the system 10. In this arrangement the effect of the throttles in the cutoff valve 38 can be neglected for the relevant exciter frequencies, so that the suspension system 10 is substantially blocked in its rest position.

One of the pistons 22 may either, as described above, be actively retracted by means of the pressure ratios in the suspension system 10, or by an external excitation in the case of a pressureless system. The case of a retracted piston 22 in a non-pressurized suspension system 10 occurs with an external excitation of the suspension system 10, for example when a vehicle wheel moves over a curb or a pothole.

If the cutoff valve 38 is moved into its right-hand switching position, whilst one piston 22 is at least partly retracted into a hydraulic cylinder 18, 20, the suspension system 10 is at first not blocked, because a "cross exchange" of hydraulic fluid between the working spaces 24, 28 of the hydraulic cylinders 19, 21 is possible. On account of the spring force of the twisted stabilizer 16 the suspension system 10 will at first center itself, i.e. the cylinder/piston units 18, 20 will move into a position in which they are extended to the same extent, but not maximally. Owing to the gravitational force and the forces of its bearings acting on the stabilizer 16 the two cylinder/piston units 18, 20 will, however, gradually move into their rest positions, i.e. into their maximally extended positions. In doing so, hydraulic fluid is displaced via the throttles into the reservoir 34 or additionally drawn from the latter. On account of the small flow cross section of the throttle the suspension system needs some time until it is placed in its rest position and is substantially blocked there.

In order to accelerate the movement of the cylinder/piston units 18, 20 into their rest positions, check valves 40 may optionally be provided. These check valves 40 are, as indicated in FIG. 1 in broken lines, attached to the suspension system 10 and, as compared to the throttles of the cutoff valve 38, enable a more rapid additional intake of hydraulic fluid from the reservoir 34.

FIGS. 2a to 2e each show cylinder/piston units 18, 20 in different operating positions, FIGS. 2a and 2b representing each a cylinder/piston unit 18, 20 of the suspension system 10 in accordance with the invention. In FIG. 2a the piston 22 is maximally retracted, and in FIG. 2b it is maximally extended. Thus, FIG. 2b reflects the rest position of the cylinder/piston unit 18, 20 according to FIG. 1. The difference in the overall height between the two positions amounts to exactly one stroke length x which is illustrated in FIG. 2a by a double arrow.

FIGS. 2c to 2e show a cylinder/piston unit 18, 20 as used in conventional suspension systems, with FIG. 2e indicating a rest position of the cylinder/piston unit 18, 20. Since in the conventional suspension systems solely one cylinder/piston unit 18, 20 is associated with each vehicle axle, this cylinder/piston unit has to provide one stroke length x in both directions. This results in a maximally retracted position according to FIG. 2c and a maximally extended position according to FIG. 2e.

The difference in the overall heights in the rest positions of the two cylinder/piston units 18, 20 thus amounts to one stroke length x (cf. FIGS. 2b and 2d). As regards the height of the construction space to be provided for the cylinder/piston unit 18, 20, even a reduction by two stroke lengths x is possible, since for this the maximum overall height in each case (cf. FIGS. 2b and 2e) is decisive.

Consequently, in particular as far as the overall height is concerned, the suspension system 10 in accordance with the invention only requires a substantially smaller construction space.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:
1. A suspension system including
first and second wheel carriers, a stabilizer having a first end and a second end, said stabilizer being coupled to said wheel carriers, a first cylinder/piston unit being arranged between said first end of the stabilizer and said first wheel carrier, and a second cylinder/piston unit being arranged between said second end of said stabilizer and said second wheel carrier, said first and second cylinder/piston units each being a double-acting cylinder/piston unit, and said first and second cylinder/piston units being cross-connected, said first and second cylinder/piston units each having two working chambers and each of said first and second cylinder/piston units having a defined rest position in which one of the working chambers of each of the first and second cylinder/piston units is at a minimum volume such that upon supplying pressure to said first and second cylinder/piston units, one of said piston/cylinder units is actuated while the other one of said piston/cylinder units remains in the rest position.

2. The suspension system according to claim 1, wherein a valve block is provided for controlling the first and second cylinder/piston units, said valve block having two separate valves.

3. A suspension system including first and second wheel carriers, a stabilizer having a first end and a second end, said stabilizer being coupled to said wheel carriers, a first cylinder/piston unit being arranged between said first end of the stabilizer and said first wheel carrier, and a second cylinder/piston unit being arranged between said second end of said stabilizer and said second wheel carrier, said first and second cylinder/piston units each being a double-acting cylinder/piston unit, and said first and second cylinder/piston units being cross-connected, said first and second cylinder/piston units each having two working chambers and each of said first and second cylinder/piston units having a defined rest position in which one of the working chambers of each of the first and second cylinder/piston units is at a minimum volume such that upon supplying pressure to said first and second cylinder/piston units, one of said piston/cylinder units is actuated while the other one of said piston/cylinder units remains in the rest position, wherein a valve block is provided for controlling said first and second cylinder/piston units, wherein said valve block includes a 4/2-port directional valve.

4. A suspension system including first and second wheel carriers, a stabilizer having a first end and a second end, said stabilizer being coupled to said wheel carriers, a first cylinder/piston unit being arranged between said first end of the stabilizer and said first wheel carrier, and a second cylinder/piston unit being arranged between said second end of said stabilizer and said second wheel carrier, said first and second cylinder/piston units each being a double-acting cylinder/piston unit, and said first and second cylinder/piston units being cross-connected, said first and second cylinder/piston units each having two working chambers and each of said first and second cylinder/piston units having a defined rest position in which one of the working chambers of each of the first and second cylinder/piston units is at a minimum volume such that upon supplying pressure to said first and second cylinder/piston units, one of said piston/cylinder units is actuated while the other one of said piston/cylinder units remains in the rest position, wherein a valve block is provided for controlling said first and second cylinder/piston units, wherein said valve block includes a cutoff valve.

5. The suspension system according to claim 4, wherein said cutoff valve is a 4/2-port directional valve which in a basic position connects its four ports in a throttled manner.

\* \* \* \* \*